US009779420B2

(12) United States Patent
Lam

(10) Patent No.: US 9,779,420 B2
(45) Date of Patent: Oct. 3, 2017

(54) SYSTEMS AND METHODS FOR OBSERVING THE MOVEMENTS OF PASSENGERS ON CONVEYING DEVICES

(71) Applicant: Bernada Limited, Kowloon (HK)

(72) Inventor: Hon Sang Lam, Kowloon (HK)

( * ) Notice: Subject to any disclaimer, the term of this patent is extended or adjusted under 35 U.S.C. 154(b) by 418 days.

(21) Appl. No.: 14/519,012

(22) Filed: Oct. 20, 2014

(65) Prior Publication Data

US 2016/0110769 A1   Apr. 21, 2016

(51) Int. Cl.
  *G06Q 30/00* (2012.01)
  *G06Q 30/02* (2012.01)
  *B66B 31/00* (2006.01)

(52) U.S. Cl.
  CPC ......... *G06Q 30/0265* (2013.01); *B66B 31/00* (2013.01); *G06Q 30/0261* (2013.01); *G06Q 30/0269* (2013.01); *G06Q 30/02* (2013.01); *G06Q 30/0241* (2013.01); *G06Q 30/0251* (2013.01)

(58) Field of Classification Search
  None
  See application file for complete search history.

(56) References Cited

U.S. PATENT DOCUMENTS

| | | | | |
|---|---|---|---|---|
| 5,482,153 A | * | 1/1996 | Abraham | B66B 27/00 198/322 |
| 2003/0078840 A1 | * | 4/2003 | Strunk | G06Q 30/0254 705/14.52 |
| 2004/0075618 A1 | * | 4/2004 | Kohan | G09F 19/22 345/1.1 |
| 2005/0217971 A1 | * | 10/2005 | Kim | B66B 31/02 198/338 |
| 2008/0079908 A1 | * | 4/2008 | Choi | G03B 21/56 353/79 |
| 2010/0122890 A1 | * | 5/2010 | Lin | B66B 23/22 198/326 |
| 2010/0161409 A1 | * | 6/2010 | Ryu | G06Q 30/02 705/14.43 |
| 2012/0073933 A1 | * | 3/2012 | Senger | B66B 29/00 198/323 |
| 2012/0158502 A1 | * | 6/2012 | Chung | G06Q 30/0269 705/14.53 |
| 2013/0110666 A1 | * | 5/2013 | Aubrey | G06Q 30/0269 705/26.5 |

(Continued)

FOREIGN PATENT DOCUMENTS

GB    WO 2015177525 A1 * 11/2015 ......... G06Q 30/0201

*Primary Examiner* — Meredith A Long

(57) ABSTRACT

According to the embodiments of the invention, methods and apparatuses are used for observing the movements of passengers on transport conveyors and presenting advertisements thereon. Steps on an escalator or other conveyer employ touch screens and/or detectors which determine the brand & style of a shoe placed on the step. An image-forming module projects advertisements and other media content onto a transparent glass surface that is viewable by the passengers. The media content is selectively displayed based on the brand and/or style of passengers' shoes. Passengers may interact with the media content via the touch screen by carrying out gestures with their feet. Passenger interest in certain ads is detectable and may be used for consumer research purposes.

6 Claims, 3 Drawing Sheets

(56) References Cited

U.S. PATENT DOCUMENTS

| | | | |
|---|---|---|---|
| 2013/0339156 A1* | 12/2013 | Sanjay | G06Q 30/02 |
| | | | 705/14.66 |
| 2014/0052567 A1* | 2/2014 | Bhardwaj | G06Q 30/0631 |
| | | | 705/26.7 |
| 2014/0100955 A1* | 4/2014 | Osotio | G06F 3/011 |
| | | | 705/14.55 |
| 2015/0009015 A1* | 1/2015 | Nakata | G06K 7/10366 |
| | | | 340/10.1 |
| 2015/0317925 A1* | 11/2015 | Advaney | G09F 23/00 |
| | | | 40/524 |
| 2015/0344270 A1* | 12/2015 | Goldstein | B66B 23/02 |
| | | | 700/230 |
| 2015/0371260 A1* | 12/2015 | Chan | G06Q 30/0253 |
| | | | 705/14.51 |
| 2015/0379962 A1* | 12/2015 | Jung | G09F 19/12 |
| | | | 345/690 |
| 2016/0012475 A1* | 1/2016 | Liu | G06Q 30/0251 |
| | | | 705/14.49 |

* cited by examiner

SYSTEMS AND METHODS FOR OBSERVING THE MOVEMENTS OF PASSENGERS ON CONVEYING DEVICES

FIELD OF THE INVENTION

This invention is generally related to apparatuses for transporting individuals. More specifically, this invention is related to an escalator with observational and advertising features.

BACKGROUND OF THE INVENTION

Conventional passenger conveyors, such as moving walkways or escalators, include a series of pallets or steps that move in a closed loop. Passenger conveyors allow people to stand or walk along the steps while being transported across a distance. The steps are typically attached to a step chain, which provides forward movement to the steps. More specifically, a drive sheave imparts motion to step chains thereby moving the steps, and any people located on the steps, along a predetermined track. For escalators, the track extends between a lower elevation and a higher elevation and back to the lower elevation in a closed loop. Moving walkways can have inclined, declined, or substantially flat tracks and sometimes include a pair of oppositely traveling, parallel walkways.

However, all escalators and transport devices of the prior art are constructed solely to move individuals. The escalators serve no other purposes. That is, they do not provide aesthetics, entertain passengers, or collect environmental information. Thus, in cities and other crowded environments escalators take up an abundance of space and provide little function besides the mere transport of people.

Online advertising has grown drastically since the advent of the internet era. Such advertising differs from the traditional advertising because online advertising can be customized to the favorites and preferences of a particular viewer, whereas traditional advertising allows a company to market its marketing campaign broadly to a big group of target audience. Also, online marketing can be made on-demand. Such advertising media can be made available to a user at any time or place, without restriction, provided the user enters an area having common interests with an advertiser. In other words, there is no limitation by geography and time for online advertising whereas traditional advertising is often limited by these restrictions. As a result, online marketing makes online shopping more favorable and presents opportunities to attract new business.

On the other hand, traditional shops that sell products in the traditional channel are under greater pressure. Retailers, for example, are required to provide greater value-added services to entice customers back to shops rather than staying at home to shop online. The retailers may wish to stop using traditional approaches to market their products to the customers. One way to better target their customers is through a combination of both online and offline advertising. As a result, technologies that provide a platform for offering services combining online and offline products and services are greatly appreciated.

In view of the foregoing, there is a need for a system and method for identifying and assessing fines to vehicles that do not yield to pedestrians in a crosswalk.

SUMMARY OF THE INVENTION

According to the embodiments of the invention, methods and apparatuses are used for observing the movements of passengers on transport conveyors and presenting advertisements thereon. Steps on an escalator or other conveyer employ touch screens and/or detectors which determine the brand & style of a shoe placed on the step. An image-forming module projects advertisements and other media content onto a transparent glass surface that is viewable by the passengers. The media content is selectively displayed based on the brand and/or style of passengers' shoes. Passengers may interact with the media content via the touch screen by carrying out gestures with their feet. Passenger interest in certain ads is detectable and may be used for consumer research purposes.

In an embodiment of the disclosed technology, an observation system observes passengers on a conveying device to draw attention from the passengers travelling on the conveying device based on detected interests of the passengers. The system may employ one or more of the following components: a) a set of contiguous, movable conveying steps, each with a touch screen sensitive to footsteps, where the each conveying step can carry a passenger to travel from a starting position to a destination; b) a shoe detector associated with each of the movable conveying steps, wherein a style and a brand of shoes worn by the passengers on the movable conveying steps is detectable; c) an image-forming module configured to provide media content which can be projected on a transparent side glass, wherein the media content is generated based on the style and brand of the shoes as detected by the shoe detector, taking into account sale items nearby; d) an interest detector for estimating a level of interest of passengers based on head movements and amount of time facing towards the media content; e) a light projecting source mounted on each of the conveying steps such that the media content is projected by the light projecting source to the side glass that is adjacent to one side of the conveying device such that the media content is visible to the passengers travelling on the conveying device; f) a mobile device carried by each of the passengers on which the media content generated by the image-forming module is viewable by the passengers while travelling on the conveying steps; and/or g) a facial recognition device disposed in the touch screen to record face profiles of interested passengers for constructing customer profiles which include the media content that drew interest of the interested passengers.

In further embodiments, if the media content has drawn a threshold amount of interest from a particular passenger, as detected by an interest detector, further detailed information regarding the media content is generated and displayed to the particular passenger. A "threshold" maybe defined as a pre-configured amount of time onto which a passenger gazes at a piece of media content and/or other passenger observations in combination. If little interest has been drawn by the particular passenger as detected by the interest detector, another piece of media content with similar styles or brands of shoes is generated and displayed to the particular passenger on the touch screen visible to the particular passenger.

In further embodiments, the touch screen may be manipulated by the individual passengers. The manipulation comprises selecting another piece of media for display by using a foot to interact with the touch screen. Gestures may be performed by passengers using their feet. The gestures may be detected by a sensor associated with the screen and/or the step. For clarification of the above, a gesture, may be any motion carried out by the feet or hands of a passenger. An image capture device may determine details about each passenger and/or the passenger's shoes. Still further, another piece of media may be selectively displayed by a passenger using a foot to step on the touch screen and/or certain portions of the step.

In another embodiment of the disclosed technology, an observation system is used to observe passengers on a conveying device to draw attention from the passengers while travelling on the conveying device based on detected interests of the passengers. The system may have a set of contiguous, movable conveying steps, each with a touch screen sensitive to footsteps, where the each conveying step can carry a passenger to travel from a starting position to a destination. The system may employ a shoe detector associated with each of the movable conveying steps, where style and brand of shoes worn by the passengers on the movable conveying steps can be detected.

Furthermore, an image-forming module may be configured to provide media content which can be projected on a side glass that is see-through glass, wherein the media content is generated after preferred style, size, and brand of the shoes is detected by the shoe detector, in consideration of current on sale items nearby. A light projecting source may be mounted on each of the conveying steps, so that the media content containing the preferred style and brand of the shoes of the passengers currently on the movable conveying steps can be projected by the lighting projecting source to the side glass that is adjacent to one side of the conveying device, so that the passengers travelling on the conveying device would capture the media content projected on the side glass.

If a certain piece of media content has drawn considerable amount of interests from a particular passenger, as detected by an interest detector that can detect level of interest based on head movements and amount of time staying on the media content by the particular passenger, further detailed information regarding the current piece of media content would be generated and displayed to the particular passenger. Otherwise, if little interests have been drawn by the particular passenger, as detected by the interest detector, another piece of media content with similar styles or brands of shoes would be generated and displayed to the particular passenger on the touch screen visible to the particular passenger allowing the particular passenger to select the another piece of media for display by using a foot to step on the touch screen.

The system may further employ a face recognition device included in the touch screen to record face profiles of the particular passenger in order to build up a customer profile by including the face profiles and the certain piece of media content that has drawn considerable amount of interests from the particular passenger. The particular passenger may be recognized instantly during a subsequent visit when combining the face profiles and the size of the shoes of the particular customer.

DETAILED DESCRIPTION

Referring now to the figures, methods and apparatuses are used for observing the movements of passengers on transport conveyors and presenting advertisements thereon. Steps on an escalator or other conveyer employ touch screens and/or detectors which determine the brand & style of a shoe placed on the step. An image-forming module projects advertisements and other media content onto a transparent glass surface that is viewable by the passengers. The media content is selectively displayed based on the brand and/or style of passengers' shoes. Passengers may interact with the media content via the touch screen by carrying out gestures with their feet. Passenger interest in certain ads is detectable and may be used for consumer research purposes.

Figure 1:
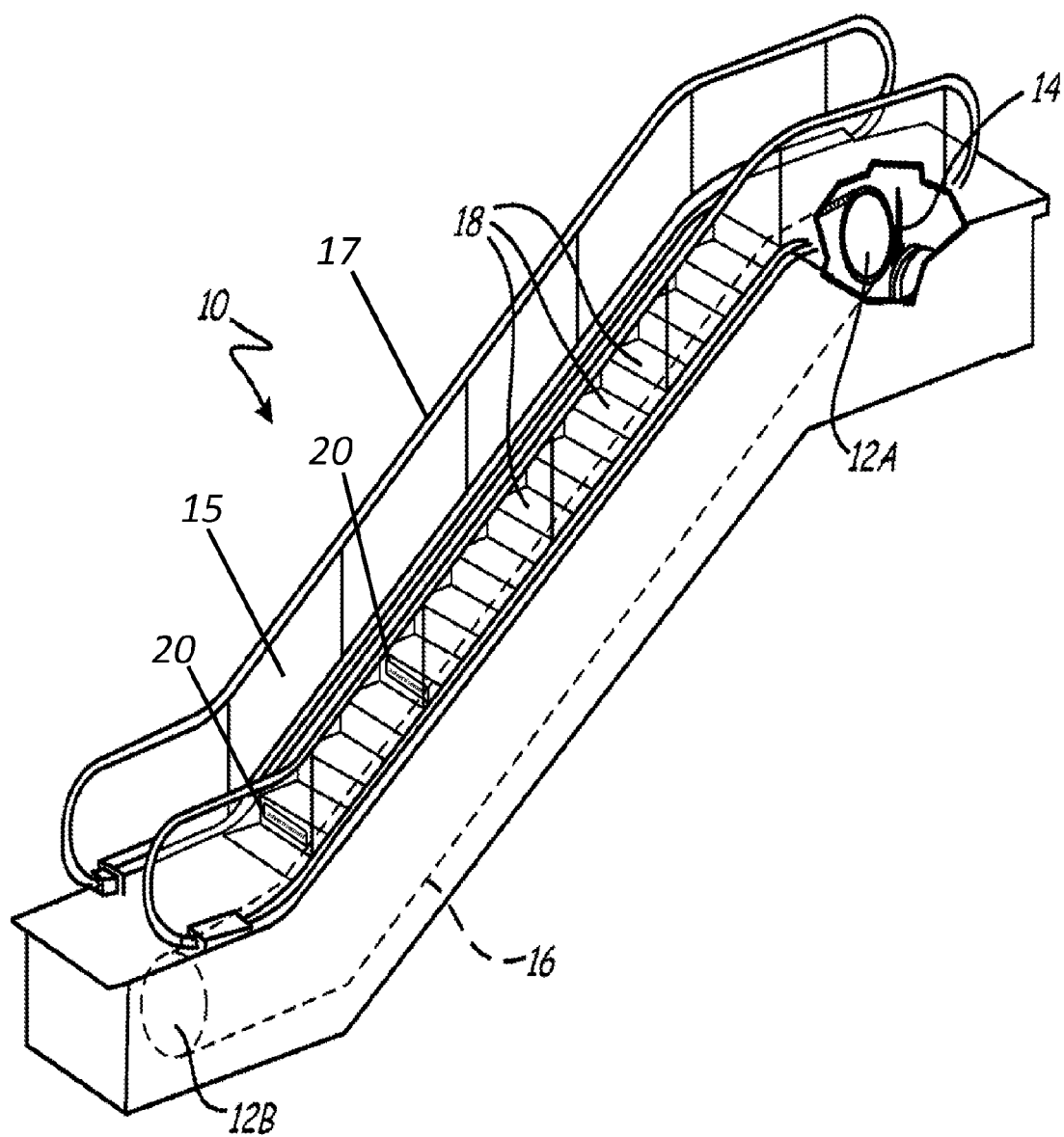
FIG. 1 is a perspective view of a passenger conveying escalator according to an embodiment of the disclosed technology.

Referring now to FIG. 1, a side elevation view of a system according to an embodiment of the present invention is shown. The depicted escalator 10 is an example of a typical passenger conveyor used to transport individuals. In the depicted embodiment, passenger conveyor 10 is an escalator having drive sheave 12A and guide sheave 12B. Drive sheave 12A is located in an upper landing of passenger conveyor 10 and is connected to a motor. Guide sheave 12B is located in a lower landing of passenger conveyor 10 and is not directly associated with a motor. Main drive shaft brake 14 is located adjacent and connected to drive sheave 12A in the upper landing. Step chain 16 extends around an outer surface of both drive sheave 12A and guide sheave 12B to form a closed loop extending from the upper landing to the lower landing. Sheave 12A has teeth or sprockets that match the chain links of step chain 16 and provide for secure engagement of step chain 16.

A plurality of steps 18 have a top surface for carrying passengers and a bottom surface connected to step chain 16 for propulsion along with step chain 16 around the closed loop. Although passenger conveyor 10 is illustrated as an escalator, main drive shaft brake 14 is not so limited and is appropriate for other systems such as, but not limited to, moving walkways. During normal operation of passenger conveyor 10, drive sheave 12A rotates and engages step chain 16. The forward motion imparted to step chain 16 propels step chain 16, as well as steps 18, between the upper landing and the lower landing.

Steps 18 travel in a closed loop between the upper landing and the lower landing. When located above step chain 16, and moving in the selected direction of travel, steps 18 carry passengers either up or down passenger conveyor 10. When located beneath step chain 16, or otherwise not exposed for use by passengers and moving in a return direction between the upper and lower landings, steps 18 are free of passengers and simply return to the beginning of the loop on the passenger side. If an abnormal condition occurs, such as over-speed or an unintentional reversal in direction, main drive shaft brake 14 is activated. Actuation of main drive shaft brake 14 halts downward movement of drive sheave 12A, thereby stopping movement of step chain 16 and steps 18.

Screens 20 are depicted on the vertical surface of some of the steps 18. The screens 20 may be touch screens which employ a capacitive surface for interaction with the screen. The screens 20 may be accompanied by sensors which may be capable of detecting foot gestures performed by users standing on the steps 18. Other sensors, such as cameras, may recognize faces of passengers as well as styles and brands of shoes worn by passengers. Still further, other sensors may monitor passengers faces and estimate a passengers interested in a given advertisement based on the passengers head movement and time spent gazing at the advertisement. An interest detector may be used for estimating a level of interest of passengers based on head movements and amount of time facing towards the media content.

Depending on the type of shoes being worn by the passenger and/or the passengers detected interested in viewing media content, advertisements and other product information may be display on different portions of the escalator 10. The advertisements may be displayed on the screens 20 along the vertical sides of the steps 18. The advertisements may be displayed such that the ads pertaining to a given passenger are shown on a screen 20 that is at the passenger's eye level. Thus, the advertisement would be displayed on a step 18 that may be several steps above the particular step on which the passenger is standing.

In further embodiments, the advertisements may be projected onto the side walls 15 of the escalator 10. The side walls 15 may be formed of transparent glass such that light projected onto the surface of the glass is visible from both sides thereof. Alternatively, advertisements may be incorporated onto a handrail 17 of the escalator 10 or some portion of the escalator associated with the handrail 17.

Figure 2:
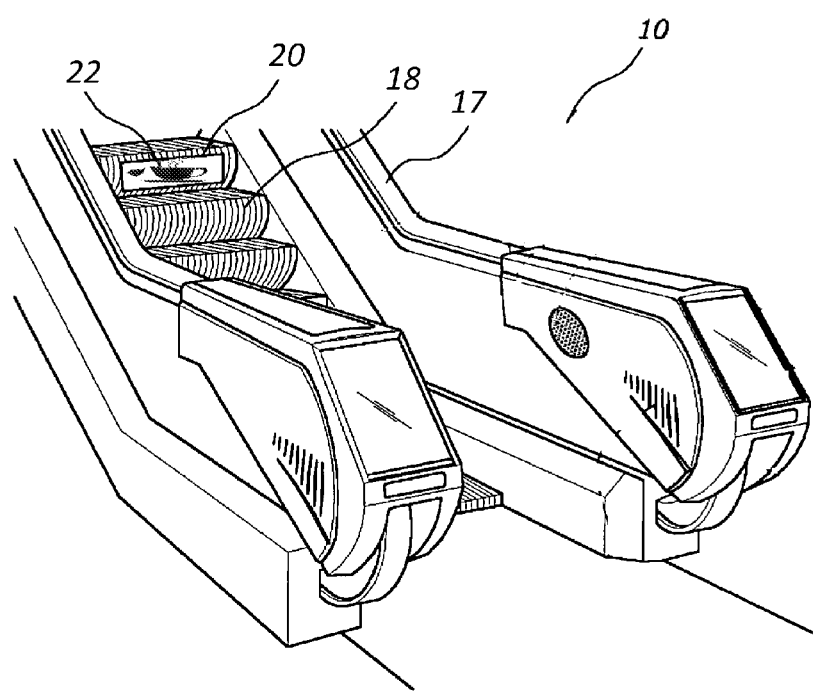
FIG. 2 is a perspective view of a passenger conveying escalator with advertising screens according to an embodiment of the disclosed technology.

FIG. 2 is a perspective view of a passenger conveying escalator with advertising screens according to an embodiment of the disclosed technology. The screen 20 is depicted on the vertical surface of one of the steps 18 of the escalator 10. An advertisement 22 is displayed on the screen and visible to multiple passengers riding on the escalator 10.

Figure 3:
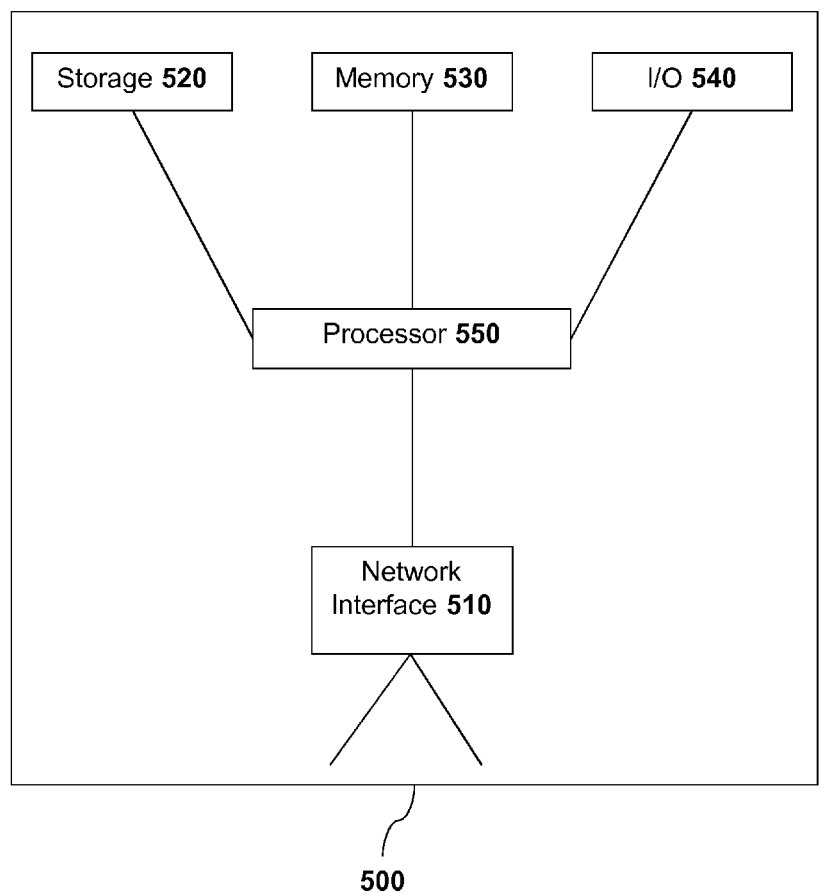
FIG. 3 is a high-level block diagram of a microprocessor device that may be used to carry out the disclosed technology.

FIG. 3 is a high-level block diagram of a microprocessor device that may be used to carry out the disclosed technology. The device 500 comprises a processor 550 that controls the overall operation of a computer by executing the reader's program instructions which define such operation. The reader's program instructions may be stored in a storage device 520 (e.g., magnetic disk, database) and loaded into memory 530 when execution of the console's program instructions is desired. Thus, the device 500 will be defined by the program instructions stored in memory 530 and/or storage 520, and the console will be controlled by processor 550 executing the console's program instructions.

The device 500 may also include one or a plurality of input network interfaces for communicating with other devices via a network (e.g., the internet). The device 500 further includes an electrical input interface for receiving power and data. The device 500 also includes one or more output network interfaces 510 for communicating with other devices. The device 500 may also include input/output 540 representing devices which allow for user interaction with a computer (e.g., display, keyboard, mouse, speakers, buttons, etc.).

One skilled in the art will recognize that an implementation of an actual device will contain other components as well, and that FIG. 3 is a high level representation of some of the components of such a device for illustrative purposes. It should also be understood by one skilled in the art that the method and devices depicted in FIGS. 1 and 2 may be implemented on a device such as is shown in FIG. 3.

While the disclosed invention has been taught with specific reference to the above embodiments, a person having ordinary skill in the art will recognize that changes can be made in form and detail without departing from the spirit and the scope of the invention. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

What is claimed is:

1. An observation system to observe passengers on a conveying device to draw attention from the passengers while travelling on the conveying device based on detected interests of the passengers, comprising:
    a set of contiguous, movable conveying steps, each with a touch screen sensitive to footsteps, wherein each conveying step can carry a passenger to travel from a starting position to a destination;
    a shoe detector associated with each of the movable conveying steps, wherein a style and a brand of shoes worn by the passengers on the movable conveying steps is detectable;
    an image-forming module configured to provide media content which can be displayed to the passenger by a first touchscreen, wherein the media content is generated based on the style and brand of the shoes as detected by the shoe detector;
    an interest detector for estimating a level of interest of passengers based on head movements and amount of time facing towards the media content; and
    if the media content has drawn a threshold amount of interest from a particular passenger, as detected by an interest detector, further detailed information regarding the media content is generated and displayed to the particular passenger; and
    if little interest has been drawn by the particular passenger as detected by the interest detector, another piece of media content with similar styles or brands of shoes is generated and displayed to the particular passenger by the first touch screen.

2. The observation system of claim 1, wherein the first touch screen is manipulated by the particular passenger.

3. The observation system of claim 2, wherein the manipulation comprises selecting another piece of media for display by the first touch screen by using a foot to interact with a second touch screen.

4. The observation system of claim 1 further comprising:
    a mobile device carried by each of the passengers on which the media content generated by the image-forming module is viewable by the passengers while travelling on the conveying steps.

5. The observation system of claim 4, further comprising:
    one or more sensors accompanying a second touchscreen and capable of detecting foot gestures performed by the passenger, wherein another piece of media is selectable to be displayed by a passenger using a particular foot gesture to interact with the second touch screen.

6. An observation system to observe passengers on a conveying device to draw attentions from the passengers while travelling on the conveying device based on detected interests of the passengers, comprising:
    a set of contiguous, movable conveying steps, each with a touch screen sensitive to footsteps, wherein each conveying step can carry a passenger to travel from a starting position to a destination;
    a shoe detector associated with each of the movable conveying steps, where style and brand of shoes worn by the passengers on the movable conveying steps can be detected;
    an image-forming module configured to provide media content which can be displayed to the passenger by a touch screen, wherein the media content is generated after preferred style, size, and brand of the shoes as detected by the shoe detector;
    if a certain piece of media content has drawn considerable amount of interests from a particular passenger, as detected by an interest detector that can detect level of interest based on head movements and amount of time staying on the media content by the particular passenger, further detailed information regarding the current piece of media content would be generated and displayed to the particular passenger; otherwise, if little interests have been drawn by the particular passenger, as detected by the interest detector, another piece of media content with similar styles or brands of shoes would be generated and displayed to the particular passenger by the touch screen allowing the particular passenger to select the another piece of media for display by the touch screen when using a foot to interact with a second touch screen; and a face recognition device included in the touch screen to record face profiles of the particular passenger in order to build up a customer profile by including the face profiles and the certain piece of media content that has drawn considerable amount of interests from the particular passenger, wherein the particular passenger can be recognized instantly during a subsequent visit when combining the face profiles and the size of the shoes of the particular customer.

* * * * *